(12) United States Patent
Desireddy et al.

(10) Patent No.: US 12,717,933 B2
(45) Date of Patent: Aug. 25, 2026

(54) METHOD AND SYSTEM FOR SECURING NEURAL NETWORK MODELS

(71) Applicant: SAMSUNG ELECTRONICS CO., LTD., Suwon-si (KR)

(72) Inventors: Srividya Desireddy, Bengaluru (IN); Yogesh Sheoran, Bengaluru (IN); Sagar Mahesh Maliye, Bengaluru (IN); Balwant Singh Shekhawat, Bengaluru (IN); Aarif Zafar, Bengaluru (IN); Sharmila Mani, Bengaluru (IN); Rajesh Kumar Panda, Bengaluru (IN); Srikanth Mandalapu, Bengaluru (IN); Renju Chirakarotu Nair, Bengaluru (IN); Nikhil Sahni, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 895 days.

(21) Appl. No.: 17/835,649

(22) Filed: Jun. 8, 2022

(65) Prior Publication Data

US 2022/0327222 A1 Oct. 13, 2022

Related U.S. Application Data

(63) Continuation of application No. PCT/KR2022/095075, filed on Apr. 7, 2022.

(30) Foreign Application Priority Data

Apr. 7, 2021 (IN) ............................ 202141016459
Jan. 31, 2022 (IN) ............................ 202141016459

(51) Int. Cl.
*G06F 21/60* (2013.01)
*G06F 11/34* (2006.01)
(Continued)

(52) U.S. Cl.
CPC ........ *G06F 21/602* (2013.01); *G06F 11/3495* (2013.01); *G06N 3/04* (2013.01); *G06N 3/10* (2013.01)

(58) Field of Classification Search
CPC ..... G06F 21/602; G06F 11/3495; G06N 3/04; G06N 3/10
See application file for complete search history.

(56) References Cited

U.S. PATENT DOCUMENTS

2018/0375638 A1* 12/2018 Khanna .................... G06N 3/04
2019/0042878 A1 2/2019 Sheller et al.
(Continued)

FOREIGN PATENT DOCUMENTS

CN 110062014 7/2019
CN 110084365 8/2019
(Continued)

OTHER PUBLICATIONS

Zuo et al., SEALing Neural Network Models in Secure Deep Learning Accelerators, 2020 (Year: 2020).*
(Continued)

*Primary Examiner* — Tamara T Kyle
*Assistant Examiner* — Jacqueline C. Meyer
(74) *Attorney, Agent, or Firm* — NIXON & VANDERHYE P.C.

(57) ABSTRACT

Embodiments herein provide a method for securing Neural Network (NN) models. The method includes: identifying, by the first electronic device, a crucial layer of a first NN model that is to be deployed for processing in a second electronic device. The method includes extracting, by the first electronic device, the crucial layer of the first NN model. The method includes encrypting, by the first electronic device, the crucial layer. The method includes generating, by the first electronic device, a second NN model includes the
(Continued)

400
START
Identify the crucial layer of the first NN model that is to be deployed for processing in the second electronic device — 401
Extract the crucial layer of the first NN model — 402
Encrypt the crucial layer — 403
Generate the second NN model includes the encrypted crucial layer — 404
Deploy the second NN model to the second electronic device for processing in the second electronic device — 405
END encrypted crucial layer. The method includes deploying, by the first electronic device, the second NN model to the second electronic device for processing in the second electronic device.

11 Claims, 12 Drawing Sheets

(51) Int. Cl.
*G06N 3/04* (2023.01)
*G06N 3/10* (2006.01)

(56) References Cited

U.S. PATENT DOCUMENTS

| | | | | |
|---|---|---|---|---|
| 2019/0228294 | A1 | 7/2019 | Hwang | |
| 2019/0334716 | A1* | 10/2019 | Kocsis | G06N 20/00 |
| 2020/0082259 | A1* | 3/2020 | Gu | G06N 3/045 |
| 2020/0380367 | A1* | 12/2020 | Gupta | G06F 18/2148 |
| 2021/0042601 | A1* | 2/2021 | Liu | H04L 9/0643 |

FOREIGN PATENT DOCUMENTS

| | | |
|---|---|---|
| CN | 110874471 | 3/2020 |
| KR | 10-2019-0089628 | 7/2019 |
| WO | 2020/151964 | 7/2020 |

OTHER PUBLICATIONS

Wu et al., Differential Evolution Based Layer-Wise Weight Pruning for Compressing Deep Neural Networks, 2021 (Year: 2021).*
Xu et al., CryptoNN: Training Neural Networks over Encrypted Data, 2019 (Year: 2019).*
Zuo et al., SEALing Neural Network Models in Secure Deep Learning Accelerators, Aug. 2020 (Year: 2020).*
Wu et al., Differential Evolution Based Layer-Wise Weight Pruning for Compressing Deep Neural Networks, Jan. 2021 (Year: 2021).*
Examination Report dated Nov. 17, 2022 issued by the Indian Patent Office for Indian Patent Application No. 202141016459.
Extended European Search Report dated Apr. 3, 2024 issued in European Patent Application No. 22785050.0.
Search Report and Written Opinion issued Jul. 26, 2022 in counterpart International Patent Application PCT/KR2022/095075.
Zhuo, Pengfei, et al., "SEALing Neural Network Models in Secure Deep Learning Accelerators," arXiv:2008.02752v1, Aug. 2020, retrieved on Jul. 5, 2022; retrieved from https://arxiv.org/pdf/2008.03752va.-df, 25 pages.
Paper: Olga Ohrimenko et al., "Oblivious Multi-Party Machine Learning on Trusted Processors", Proceedings of the 25$^{th}$ USENIX Security Symposium, Aug. 10-12, 2016, Austin, TX, 19 pp., at URL: https://www.usenix.org/conference/usenixsecurity16/technical-sessions/presentations/ohrimenko.
Sebastian P. Bayerl et al., "Offline Model Guard: Secure and Private ML on Mobile Devices", 23$^{rd}$ Design, Automation and Test in Europe Conference (Dtae '20), 2020, 6 pp.
Fan Mo et al., "DarkneTZ: Towards Model Privacy at the Edge using Trusted Execution Environments", MobiSys '20, Jun. 15-19, 2020, Toronto, ON, Canada, 13 pp., at URL: https://pireddie.com/darknet/.
Hearing Notice (issuance date: Jan. 28, 2026) issued by the Indian Patent Office for Indian Patent Application No. 202141016459.

* cited by examiner

FIG. 7

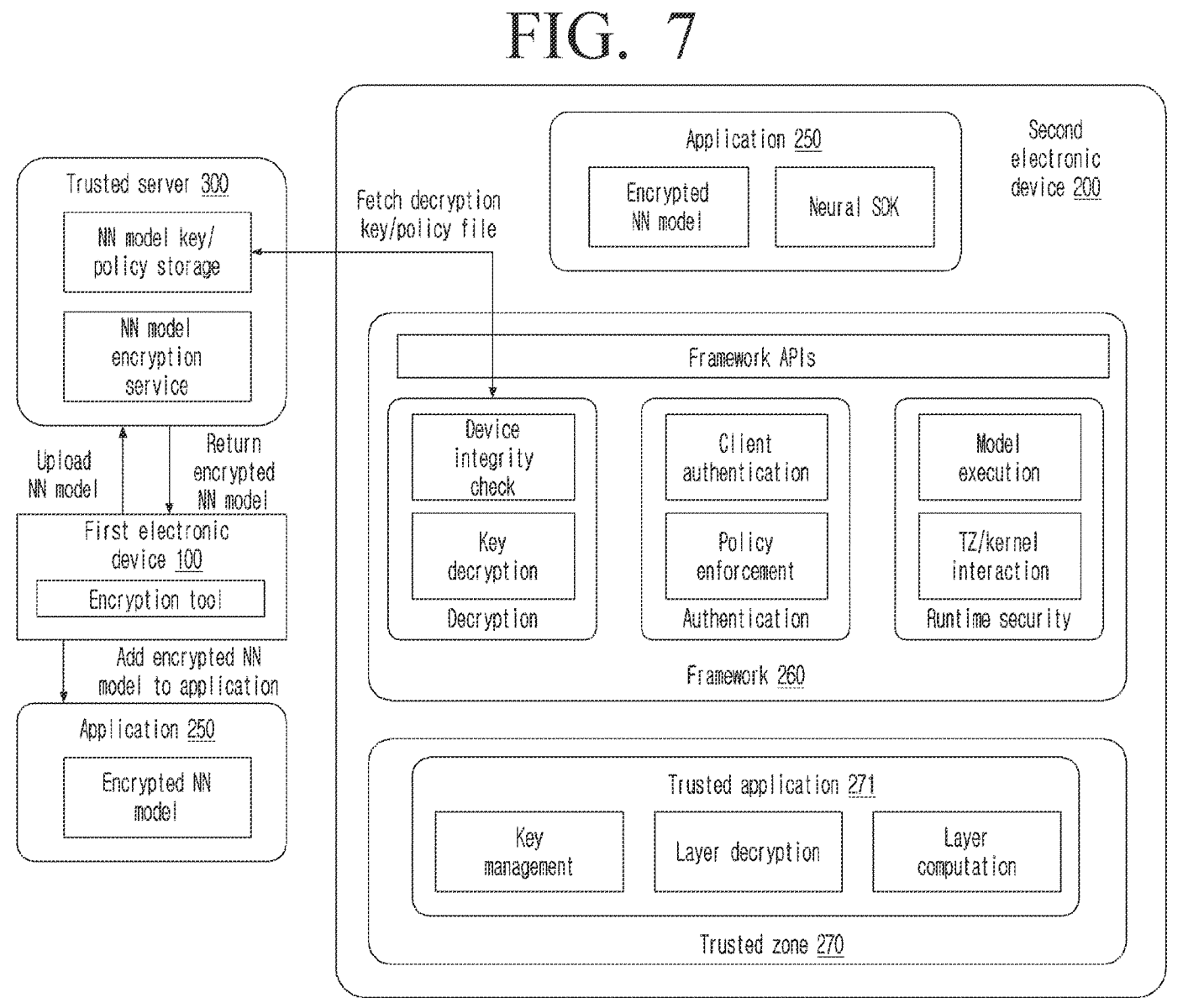

Second electronic device 200

Application 250

Encrypted NN model

Neural SDK

Framework APIs

Framework 260

Decryption

Device integrity check

Key decryption

Authentication

Client authentication

Policy enforcement

Runtime security

Model execution

TZ/kernel interaction

Trusted zone 270

Trusted application 271

Key management

Layer decryption

Layer computation

Fetch decryption key/policy file

Trusted server 300

NN model key/policy storage

NN model encryption service

Upload NN model

Return encrypted NN model

First electronic device 100

Encryption tool

Add encrypted NN model to application

Application 250

Encrypted NN model

FIG. 8
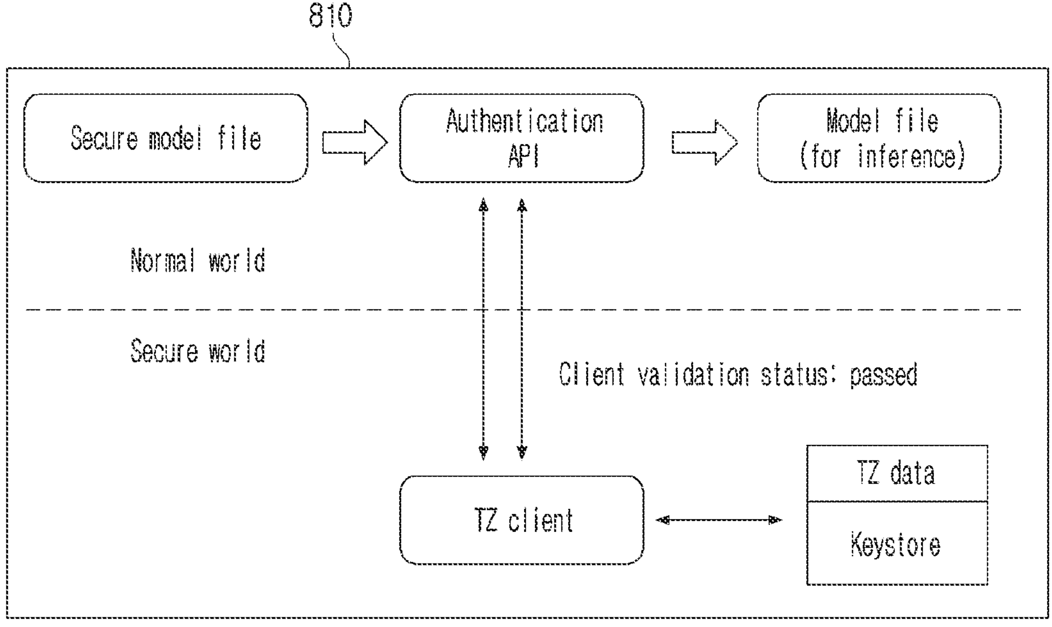
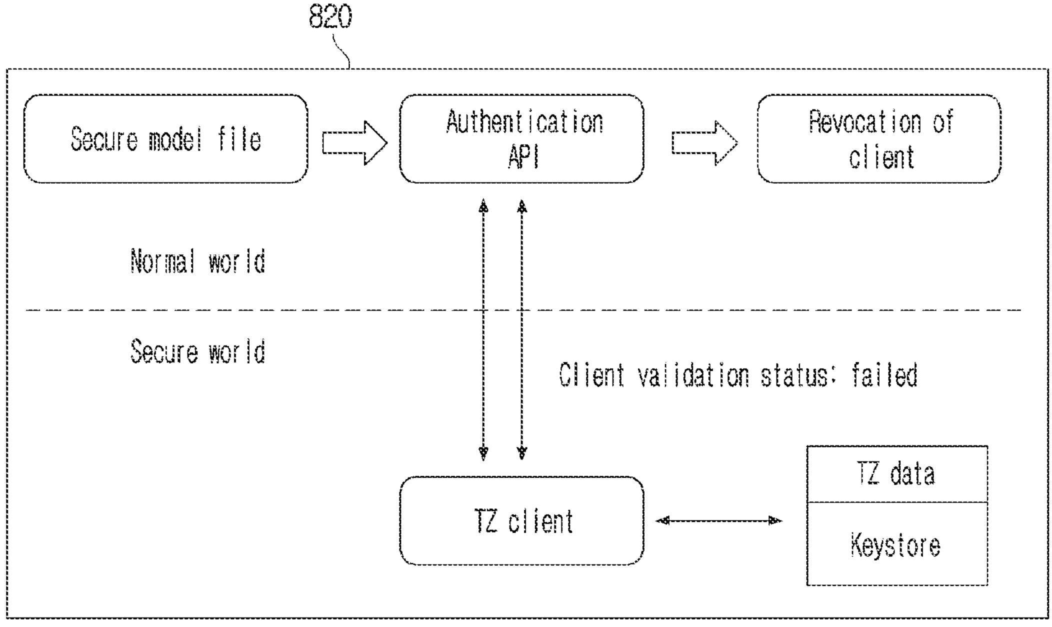

METHOD AND SYSTEM FOR SECURING NEURAL NETWORK MODELS

CROSS-REFERENCE TO RELATED APPLICATIONS

This application is a continuation of International Application No. PCT/KR2022/095075 designating the United States, filed on Apr. 7, 2022, in the Korean Intellectual Property Receiving Office and claiming priority to Indian Provisional Patent Application No. 202141016459, filed on Apr. 7, 2021, in the Indian Patent Office, and to Indian Complete Patent Application No. 202141016459, filed on Jan. 31, 2022, in the Indian Patent Office, the disclosures of all of which are incorporated by reference herein in their entireties.

BACKGROUND

Field

The disclosure relates to electronic devices, and for example, to a method and a system for securing neural network models.

Description of Related Art

Machine Learning (ML) model has become a preferred choice for mobile developers for creating advanced applications. Developing the ML model involves huge costs in terms of time and resources. Due to advancements in mobile technology, the ML model is being deployed on mobile devices. As the ML model is being deployed on the mobile devices, direct access to the ML model becomes a primary concern. The ML models using sensitive information, such as financial data, shopping histories, conversations with friends, and health-related data for training and inferencing pose to privacy risks. Privacy attacks on the ML models such as membership inference attacks, model inversion attacks, model extraction attacks, model stealing can expose user's personal and sensitive information. Conventional solutions mainly target black-box attacks, where the ML model is not directly accessible does not require knowledge of model internals, architecture of data used to train the model. But as the ML model is deployed on the mobile device, the ML model is prone to white-box attacks where adversary can get access to code, architecture, parameters, and training data set of the ML model that is residing on the mobile device.

FIG. 1 is a flowchart (10) illustrating an existing model stealing attack method on an android application for stealing the ML model integrated with the android application that is deployed in the mobile device. At 11, the method includes pulling an Android Application Package (APK) file of the target android application from the mobile device. At 12-13, the method includes performing reverse engineering on the APK file and interpreting the parameters, input and output shape, labels, etc. of the ML mode integrated with the android application. At 14, the method includes reconstructing the ML model. In order to avoid these attacks, complete encryption of the ML model is proposed in an existing ML model securing technique. But, the complete encryption of the ML model results in overhead in terms of performance that accounts for a lag of milliseconds to a few seconds. Moreover, the complete encryption of the ML model lacks protection while computation and the ML model can be accessed from Random-Access Memory (RAM) dump.

Fully homomorphic encryption of the ML model is an alternative existing ML model securing technique. The full homomorphic encryption is incredibly slow and non-performant for real-time application, cannot run ad-hoc/discovery-based queries, and ciphertext is about 10,000 times size of an original plaintext. Differential privacy is an alternative existing ML model securing technique for ML model privacy. However, an accuracy of the differential privacy needs to compromise. The differential privacy is not effective during an offline model stealing attack. Hence, a secure platform is required for the mobile device in which the ML model can be securely stored, trained, and executed on the mobile device without impacting performance.

SUMMARY

Embodiments of the disclosure provide a method and a system for securing neural network (NN) models from intellectual property theft or adversarial attacks. The method includes identifying a crucial/key layer of a NN model based on relevancy score, and securely encrypting the crucial layer of the NN model whose change brings about major deviation in output. The method provides same level of security compared to completely encrypting the NN model but less overhead in terms of performance Manual intervention for pre-identification of the crucial layer is not required in the method.

Embodiments of the disclosure enable secure run-time execution by decrypting the encrypted crucial layer using a key stored in an Advanced RISC Machines (ARM) trust-zone of the system and further computing the crucial layer of the NN model in a Trusted Execution Environment (TEE) of the system, which ensures top-level security to the NN model.

Embodiments of the disclosure perform a device integrity check prior to client validation/authentication, and a trusted zone-based client validation prior to layer decryption.

Accordingly, example embodiments herein provide a method for securing Neural Network (NN) models. The method includes: identifying, by a first electronic device, a crucial layer of a first neural network (NN) model that is to be deployed for processing in a second electronic device; extracting, by the first electronic device, a crucial layer of the first NN model; encrypting, by the first electronic device, the crucial layer; generating, by the first electronic device, a second NN model including the encrypted crucial layer; and deploying, by the first electronic device, the second NN model to the second electronic device for processing in the second electronic device.

In an example embodiment, identifying, by the first electronic device, the crucial layer of the first NN model that is to be deployed for processing in the second electronic device includes: identifying, by the first electronic device, the crucial layer of the first NN model based on of a relevance score and weights of each layer of the first NN model.

In an example embodiment, identifying, by the first electronic device, the crucial layer of the first NN model based on the relevance score of each layer of the first NN model, includes: loading, by the first electronic device, the first NN model; monitoring, by the first electronic device, a plurality of output neurons of each layer of the first NN model; determining, by the first electronic device, a relevance score of each output neuron, where the relevance score is a function of impact on an output of one layer of the first NN model for each output neuron; and determining, by the first electronic device, the crucial layer of the first NN model by identifying the layer with a highest sum of relevance score of the output neurons from that layer.

In an example embodiment, identifying, by the first electronic device, the crucial layer of the first NN model based on the weights of each layer of the first NN model, includes monitoring, by the first electronic device, behavior of the weights of each layer of the first NN model based on each training cycle of the first NN model; and determining, by the first electronic device, the crucial layer of the first NN model by identifying the layer with the weights that converge to a final value earliest.

In an example embodiment, identifying, by the first electronic device, the crucial layer of the first NN model based on the weights of each layer of the first NN model, includes: determining, by the first electronic device, an average of absolute values of the weights of each layer of the first NN model, where the first NN model is a trained NN model; and determining, by the first electronic device, the crucial layer of the first NN model by identifying the layer with a highest average of absolute values of the weights.

In an example embodiment, identifying, by the first electronic device, the crucial layer of the first NN model based on the weights of each layer of the first NN model, includes: replacing, by the first electronic device, the weights of a combination of the layers of the first NN model with arbitrary values, where the first NN model is the trained NN model; and determining, by the first electronic device, the crucial layer of the first NN model by identifying the combination of the layers that result in lowest accuracy.

In an example embodiment, encrypting, by the first electronic device, the crucial layer, includes: sending, by the first electronic device, the crucial layer to a trusted server for encrypting the crucial layer; and receiving, by the first electronic device, the encrypted crucial layer from the trusted server, where the trusted server encrypts the crucial layer using a symmetric key, encrypts the symmetric key using an asymmetric public key, and stores the encrypted symmetric key.

In an example embodiment, deploying, by the first electronic device, the second NN model to the second electronic device for processing in the second electronic device, includes: creating, by the first electronic device, a policy file including a decryption policy for the encrypted crucial layer and access control parameters for client authentication during execution on the second electronic device; and generating, by the first electronic device, an execution file including the second NN model and the policy file; and deploying, by the first electronic device, the execution file on the second electronic device.

In an example embodiment, the method includes: receiving, by the second electronic device, an input for execution of the second NN model; and executing, by the second electronic device, the execution file based on the policy file.

In an example embodiment, executing, by the second electronic device, the execution file of the second NN model based on the policy file, includes: fetching, by the second electronic device, the encrypted symmetric key from the trusted server based on the policy file; generating, by the second electronic device, the symmetric key by decrypting the encrypted symmetric key at a trusted zone of the second electronic device using an asymmetric encryption based private key stored in a secure storage of the second electronic device; extracting, by the second electronic device, the encrypted crucial layer in the second NN model from the execution file; generating, by the second electronic device, the crucial layer by decrypting the encrypted crucial layer at the trusted zone of the second electronic device using the symmetric key; and executing, by the second electronic device, the execution file using the crucial layer.

In an example embodiment, the method includes: authenticating, by the second electronic device, an application corresponds to the execution file installed in the second electronic device for allowing the application to access the second NN model for the execution; and validating, by the second electronic device, the application in the trusted zone using cryptographic certifications and attestation servers for controlled access of the second NN model.

Accordingly, example embodiments herein provide a first electronic device for securing the NN models. The first electronic device includes: a neural network (NN) securing engine comprising processing circuitry and/or executable program instructions, a memory, a processor, wherein the NN securing engine is coupled to the memory and the processor. The NN securing engine is configured to: identify a crucial layer of the first NN model to be deployed for processing in the second electronic device; extract the crucial layer of the first NN model; encrypt the crucial layer; generate the second NN model including the encrypted crucial layer; and deploy the second NN model to the second electronic device for processing in the second electronic device.

Accordingly, example embodiments herein provide the second electronic device for securing the NN models. The second electronic device includes: a neural network (NN) securing engine comprising processing circuitry and/or executable program instructions, a memory, a processor, wherein the NN securing engine is coupled to the memory and the processor. The NN securing engine is configured to: deploy the execution file including the second NN model and the policy file, wherein the second NN model includes the encrypted crucial layer, and the policy file includes the decryption policy for the encrypted crucial layer and access control parameters for client authentication during execution on the second electronic device; receive the input for execution of the second NN model; and execute the execution file based on the policy file.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments, and the embodiments herein include all such modifications.

BRIEF DESCRIPTION OF THE DRAWINGS

This method and devices are illustrated in the accompanying drawings, throughout which like reference numerals indicate like parts in the various figures. Further, the above and other aspects, features and advantages of certain embodiments of the present disclosure will be more apparent from the following detailed description, taken in conjunction with the accompanying drawings, in which:

FIG. 7 is an architectural diagram illustrating an example system for securing the NN models, according to various embodiments;

FIG. 8 is a flow diagram illustrating an example method for authenticating a client, according to various embodiments;

DETAILED DESCRIPTION

Figure 1:
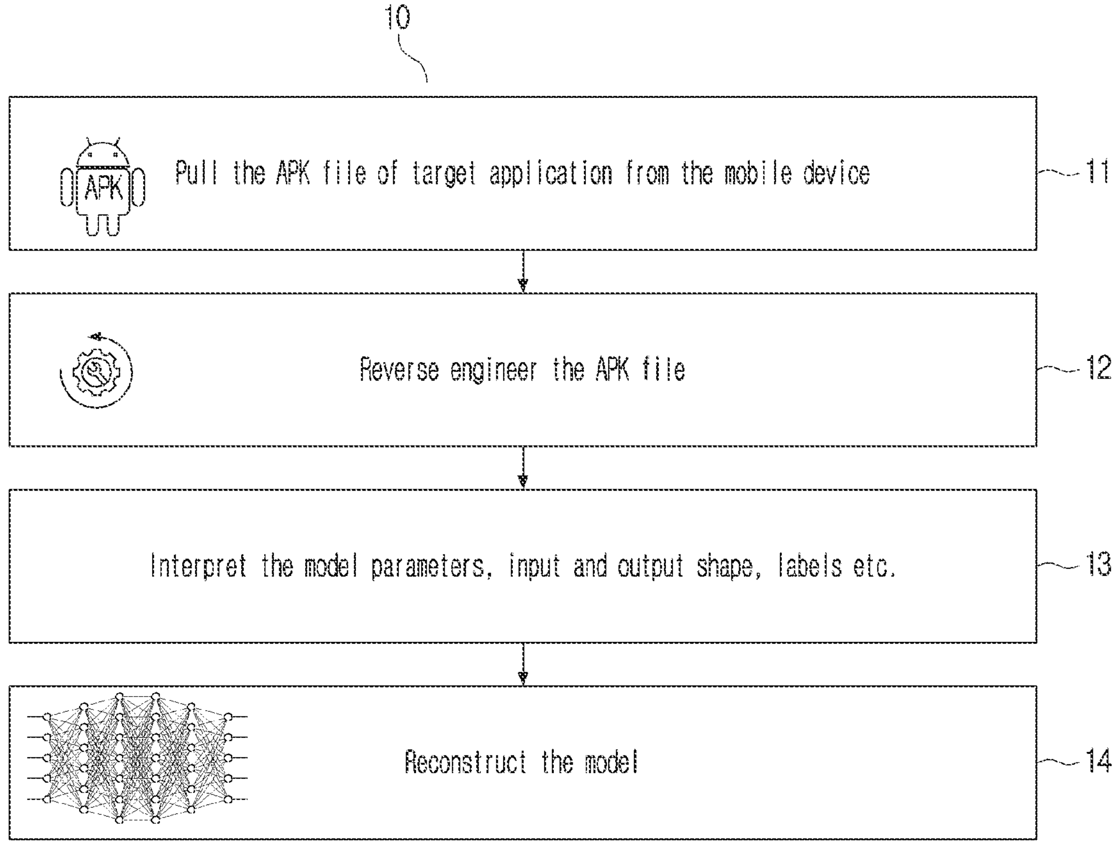
FIG. 1 is a flowchart illustrating an existing model stealing attack method on an android application for stealing a ML model integrated with an android application that is deployed in a mobile device, according to the prior art.

The various example embodiments herein and the various features and advantageous details thereof are explained more fully with reference to the non-limiting example embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally simply used to distinguish one element from another.

Accordingly, various example embodiments herein provide a method for securing Neural Network (NN) models. The method includes: identifying, by the first electronic device, a crucial layer of a first NN model that is to be deployed for processing in a second electronic device; extracting, by the first electronic device, the crucial layer of the first NN model; encrypting, by the first electronic device, the crucial layer; generating, by the first electronic device, a second NN model includes the encrypted crucial layer; and deploying, by the first electronic device, the second NN model to the second electronic device for processing in the second electronic device.

Accordingly, various example embodiments herein provide the first electronic device for securing the NN models. The first electronic device includes: a NN securing engine comprising processing circuitry and/or executable program instructions, a memory, a processor, where the NN securing engine is coupled to the memory and the processor. The NN securing engine is configured to: identify a crucial layer of the first NN model that is to be deployed for processing in the second electronic device; extract the crucial layer of the first NN model; encrypt the crucial layer; generate the second NN model including the encrypted crucial layer; and deploy the second NN model to the second electronic device for processing in the second electronic device.

Accordingly, various example embodiments herein provide the second electronic device for securing the NN models. The second electronic device includes: a NN securing engine comprising various processing circuitry and/or executable program instructions, a memory, a processor, where the NN securing engine is coupled to the memory and the processor. The NN securing engine is configured to: deploy the execution file including the second NN model and the policy file, where the second NN model includes encrypted crucial layer, and the policy file includes the decryption policy for the encrypted crucial layer and access control parameters for client authentication during execution on the second electronic device; to receive the input for execution of the second NN model; and execute the execution file based on the policy file.

Unlike existing methods and systems, the disclosed method secures the NN models from intellectual property theft or adversarial attacks. The disclosed method includes identifying the crucial/key layer of the NN model based on a relevancy score, and securely encrypting the crucial layer of the NN model whose change brings about major deviation in output. Manual intervention for pre-identification of the crucial layer is not required in the disclosed method.

Unlike existing methods and systems, the disclosed method provides secure run-time execution by allowing the system for decrypting the encrypted crucial layer using a key stored in an ARM Trustzone of the system, and computing the crucial layer of the NN model in a Trusted Execution Environment (TEE) of the system, which gives an enhanced security to the NN model.

In existing methods and systems, security of a NN model is relied on encryption of the NN model completely and running the entire NN model in a normal world environment. If the encrypted NN model is to be moved to full execution in a secure environment (e.g., trusted zone), it would result in drastic performance degradation as the available secure environment is limited by hardware resource power at disposal. Unlike existing methods and systems, the disclosed method includes finding a most important layer of the NN model, encrypting that important layer only, and the encrypted layer is only executed in the secure environment which never adversely affects the performance. The disclosed method provides same level of security compared to completely encrypting the NN model but less overhead in terms of the performance.

Referring now to the drawings, and more particularly to FIGS. 2A through 10, there are shown various example embodiments.

Figure 2A:
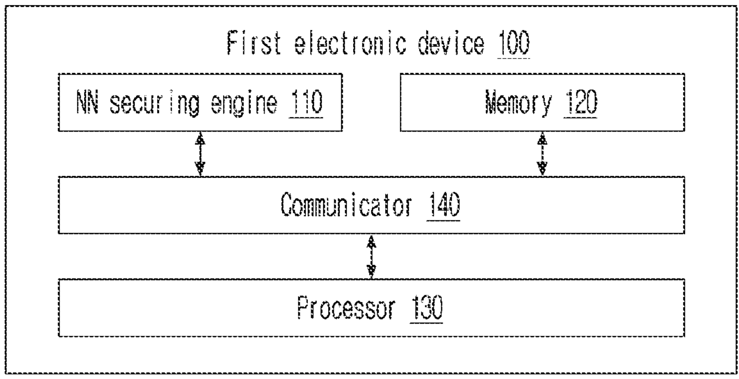
FIG. 2A is a block diagram illustrating an example configuration of a first electronic device for securing NN models, according to various embodiments.

FIG. 2A is a block diagram illustrating an example configuration of a first electronic device (100) for securing NN models, according to various embodiments. An example of an NN model is an ML model. Examples of the first electronic device (100) include, but are not limited to a smartphone, a tablet computer, a Personal Digital Assistance (PDA), a desktop computer, etc. In an embodiment, the first electronic device (100) includes a NN securing engine (e.g., including various processing circuitry and/or executable program instructions) (110), a memory (120), a processor (e.g., including processing circuitry) (130), and a communicator (e.g., including communication circuitry) (140). The NN securing engine (110) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In an embodiment, the NN securing engine (110) identifies a crucial layer of a first NN model that is to be deployed for processing in a second electronic device (200) based on a relevance score or weights of each layer of the first NN model. A best suited method to identify important/crucial layers or centrality of the NN model is determined based on a type of the NN model used and an architecture of the NN model. Four example methods to identify important/crucial layers are given below.

In a first example method to identify the important/crucial layers, the NN securing engine (110) loads the first NN model from the memory (110). Further, the NN securing engine (110) monitors a plurality of output neurons of each layer of the first NN model. Further, the NN securing engine (110) determines a relevance score of each output neuron, where the relevance score is a function of impact on an output of one layer of the first NN model for each output neuron. Further, the NN securing engine (110) determines the crucial layer of the first NN model by identifying the layer with a highest sum of relevance score of the output neurons from that layer.

In a second example method to identify the important/crucial layer, the NN securing engine (110) monitors behavior of the weights of each layer of the first NN model after each training cycle of the first NN model. Further, the NN securing engine (110) determines the crucial layer of the first NN model by identifying the layer with the weights that converges to a final value at the earliest. The second method is useful during a training phase of the first NN model. Also, the weights that achieve their true values earliest could lead to potential NN model Intellectual Property (IP) leakage on reconstructing the first NN model.

In a third example method to identify the important/crucial layer, the NN securing engine (110) determines an average of absolute values of the weights of each layer of the first NN model, where the first NN model is a trained NN model. Further, the NN securing engine (110) determines the crucial layer of the first NN model by identifying the layer with a highest average of absolute values of the weights. The third method is useful during an inference phase of the first NN model. If higher the absolute value of a node (e.g., layer), then more the influence on the next node due to its scaling factor.

In a fourth example method to identify the important/crucial layer, the NN securing engine (110) replaces the weights of a combination of the layers of the first NN model with arbitrary values, where the first NN model is a trained NN model. Further, the NN securing engine (110) determines the crucial layer of the first NN model by identifying the combination of the layers that result in lowest accuracy. The fourth method is useful during a testing phase of the first NN model. In the fourth method, the NN securing engine (110) inverts the weights of a combination of layers and validates the first NN model, where the combination of layers that result in lowest accuracy is considered important.

The NN securing engine (110) extracts the crucial layer of the first NN model. Further, the NN securing engine (110) encrypts the crucial layer. In an embodiment, the NN securing engine (110) sends the crucial layer to a trusted server (300) for encrypting the crucial layer. Further, the NN securing engine (110) receives the encrypted crucial layer from the trusted server (300). The NN securing engine (110) generates a second NN model that includes the encrypted crucial layer. In an embodiment, other than the encrypted crucial layer the second NN model includes the layers of the first NN model except for the crucial layer. Further, the NN securing engine (110) deploys the second NN model to the second electronic device (200) for processing in the second electronic device (200). In an embodiment, the NN securing engine (110) creates the policy file that includes a decryption policy for the encrypted crucial layer and access control parameters for client authentication during execution on the second electronic device (200). Further, the NN securing engine (110) generates an execution file comprising the second NN model and the policy file. Further, the NN securing engine (110) deploys the execution file on the second electronic device (200). An example of the execution file is an application package.

The memory (120) stores the first NN model. The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the first electronic device (100), a cloud storage, or any other type of external storage.

The processor (130) may include various processing circuitry and is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) may include various communication circuitry and is configured for communicating internally between hardware components in the first electronic device (100). Further, the communicator (140) is configured to facilitate the communication between the first electronic device (100) and other devices (e.g. trusted server (300) and second electronic device (200)) via one or more networks (e.g. Radio technology). The communicator (140) may include an electronic circuit specific to a standard that enables wired or wireless communication.

Although FIG. 2A shows the hardware components of the first electronic device (100) it is to be understood that various embodiments are not limited thereon. In various embodiments, the first electronic device (100) may include less or a greater number of components. Further, the labels or names of the components are used only for illustrative purpose and does not limit the scope of the disclosure. One or more components can be combined together to perform same or substantially similar function for securing the NN models.

Figure 2B:
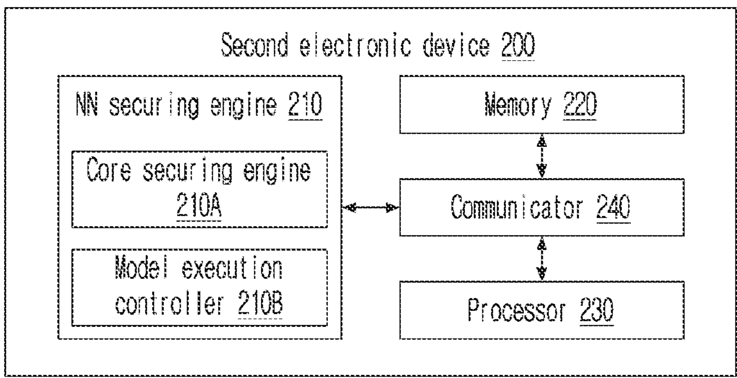
FIG. 2B is a block diagram illustrating an example configuration of a second electronic device for securing the NN models, according to various embodiments.

FIG. 2B is a block diagram illustrating an example configuration of the second electronic device (200) for securing the NN models, according to various embodiments. Examples of the second electronic device (200) include, but are not limited to a smartphone, a tablet computer, a Personal Digital Assistance (PDA), a desktop computer, an Internet of Things (IoT), a wearable device, etc. In an embodiment, the second electronic device (200) includes a NN securing engine (e.g., including various processing circuitry and/or executable program instructions) (210), a memory (220), a processor (e.g., including processing circuitry) (230), and a communicator (e.g., including communication circuitry) (240). The NN securing engine (210) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like. In an embodiment, the NN securing engine (210) includes a core securing engine (210A) and a model execution controller (210B). The core securing engine (210A) and the model execution controller (210B) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The NN securing engine (210) deploys an execution file including the second NN model and the policy file. The NN securing engine (210) receives an input for execution of the second NN model. The NN securing engine (210) executes the execution file based on the policy file. In an embodiment, the NN securing engine (210) fetches an encrypted symmetric key (e.g. encrypted Advanced Encryption Standard (AES) key) from the trusted server (300) based on the policy file. The NN securing engine (210) generates a symmetric key (e.g. AES key) by decrypting the encrypted symmetric key at a Trusted Zone (TZ) (e.g. Advanced RISC Machines (ARM) trust-zone) of the second electronic device (200) using an asymmetric encryption based private key (e.g. Rivest-Shamir-Adleman (RSA) key) stored in a secure storage of the second electronic device (200). Examples of the secure storage include, but are not limited to an Integrated Circuit (IC) chip, the memory (220), a Subscriber Identification Module (SIM), etc.

The NN securing engine (210) extracts the encrypted crucial layer in the second NN model from the execution file. The NN securing engine (210) generates the crucial layer by decrypting the encrypted crucial layer at the trusted zone of the second electronic device (200) using the symmetric key. The NN securing engine (210) executes the execution file using the crucial layer. The NN securing engine (210) authenticates an application that corresponds to the execution file installed in the second electronic device (200) for allowing the application to access the second NN model for the execution. The NN securing engine (210) validates the application in the trusted zone using cryptographic certifications and attestation servers for controlled access of the second NN model.

The memory (220) stores instructions to be executed by the processor (230). The memory (220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (220) may, in some examples, be considered a non-transitory storage medium. The term "non-transitory" may indicate that the storage medium is not embodied in a carrier wave or a propagated signal. However, the term "non-transitory" should not be interpreted that the memory (220) is non-movable. In some examples, the memory (220) can be configured to store larger amounts of information than its storage space. In certain examples, a non-transitory storage medium may store data that can, over time, change (e.g., in Random Access Memory (RAM) or cache). The memory (220) can be an internal storage unit or it can be an external storage unit of the second electronic device (200), a cloud storage, or any other type of external storage.

The processor (230) may include various processing circuitry and is configured to execute instructions stored in the memory (220). The processor (230) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (230) may include multiple cores to execute the instructions. The communicator (240) is configured for communicating internally between hardware components in the second electronic device (200). Further, the communicator (240) may include various communication circuitry and is configured to facilitate the communication between the second electronic device (200) and other devices (e.g., first electronic device (200), trusted server (300)) via one or more networks (e.g. Radio technology). The communicator (240) may include an electronic circuit specific to a standard that enables wired or wireless communication.

Although FIG. 2B shows the hardware components of the second electronic device (200) but it is to be understood that various other embodiments are not limited thereon. In various embodiments, the second electronic device (200) may include less or a greater number of components. Further, the labels or names of the components are used only for illustrative purpose and does not limit the scope of the disclosure. One or more components can be combined together to perform same or substantially similar function for securing the NN models.

Figure 2C:
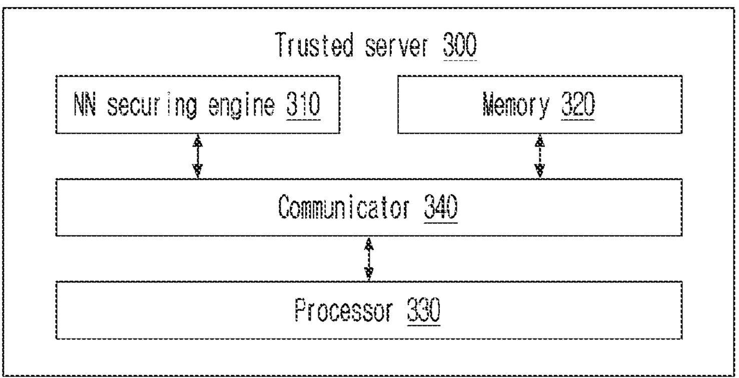
FIG. 2C is a block diagram illustrating an example configuration of a trusted server for securing the NN models, according to various embodiments.

FIG. 2C is a block diagram illustrating an example configuration of the trusted server (300) for securing the NN models, according to various embodiments. Examples of the trusted server (300) include, but are not limited to a Personal Digital Assistance (PDA), a desktop computer, an Internet of Things (IoT), etc. In an embodiment, the trusted server (300) includes a NN securing engine (e.g., including various processing circuitry and/or executable program instructions) (310), a memory (320), a processor (e.g., including processing circuitry) (330), and a communicator (e.g., including communication circuitry) (340). The NN securing engine (310) may be implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The NN securing engine (310) encrypts the crucial layer using the symmetric key (e.g. AES key) upon receiving the crucial layer from the first electronic device (100). The NN securing engine (310) encrypts the symmetric key using an asymmetric public key. The NN securing engine (310) stores the encrypted symmetric key to the memory (320). Further, the NN securing engine (310) sends the encrypted crucial layer to the first electronic device (100).

The memory (320) stores the symmetric key. The memory (320) stores instructions to be executed by the processor (330). The memory (320) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (320) may, in some examples, be considered a non-transitory storage medium. The term "non-transitory" may indicate that the storage medium is not embodied in a carrier wave or a propagated signal. However, the term "non-transitory" should not be interpreted that the memory (320) is non-movable. In some examples, the memory (320) can be configured to store larger amounts of information than its storage space. In certain examples, a non-transitory storage medium may store data that can, over time, change (e.g., in Random Access Memory (RAM) or cache). The memory (320) can be an internal storage unit or it can be an external storage unit of the trusted server (300), a cloud storage, or any other type of external storage.

The processor (330) may include various processing circuitry and is configured to execute instructions stored in the memory (320). The processor (330) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (330) may include multiple cores to execute the instructions. The communicator (340) may include various communication circuitry and is configured for communicating internally between hardware components in the trusted server (300). The communicator (340) is configured to facilitate the communication between the trusted server (300) and other devices (e.g., first electronic device (200), second electronic device (200)) via one or more networks (e.g. Radio technology). The communicator (340) may include an electronic circuit specific to a standard that enables wired or wireless communication.

Although FIG. 2C shows the hardware components of the trusted server (300) but it is to be understood that various other embodiments are not limited thereon. In various embodiments, the trusted server (300) may include less or a greater number of components. Further, the labels or names of the components are used only for illustrative purpose and does not limit the scope of the disclosure. One or more components can be combined together to perform same or substantially similar function for securing the NN models.

Figure 3:
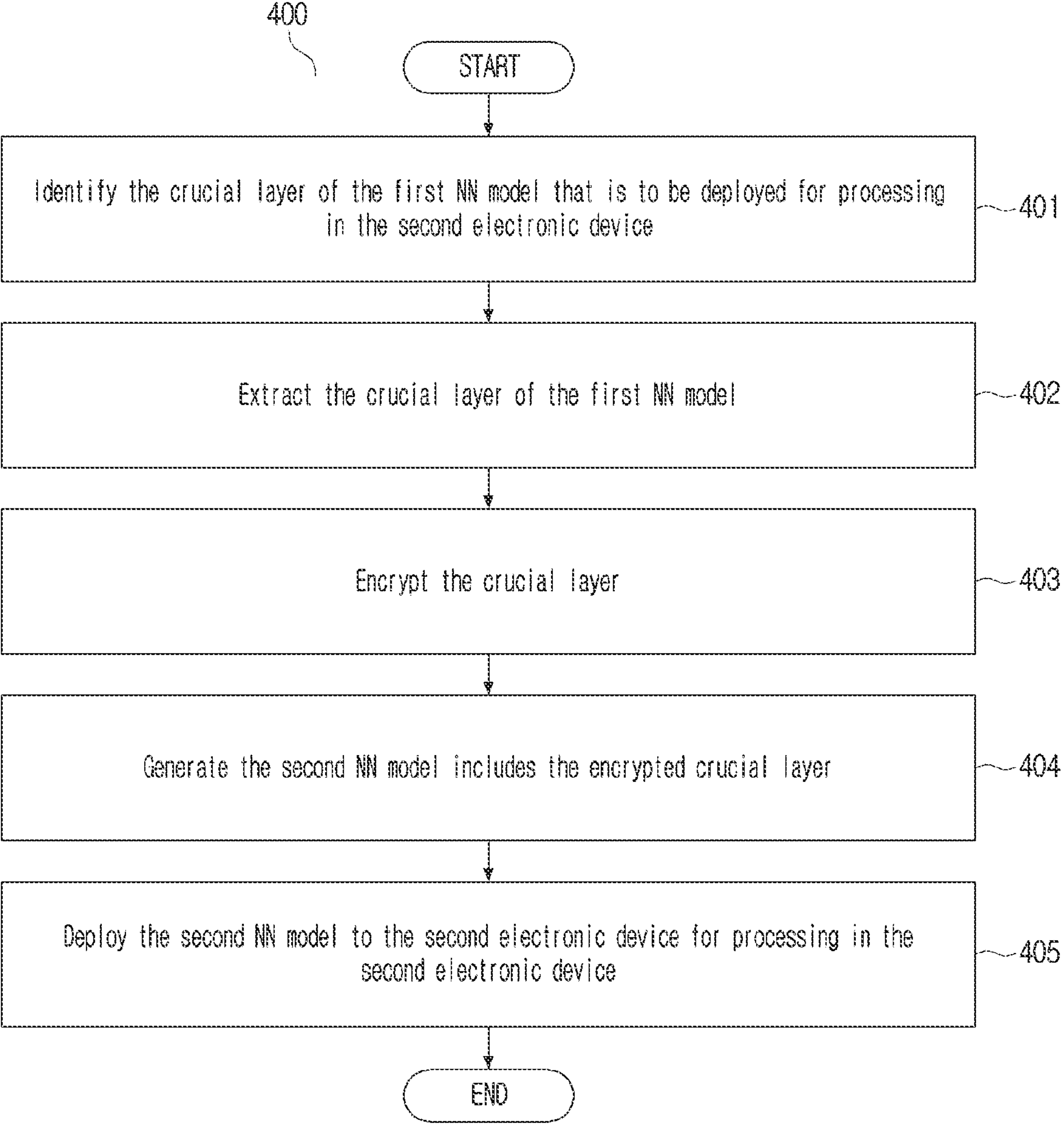
FIG. 3 is a flowchart illustrating an example method for securing the NN models, according to various embodiments.

FIG. 3 is a flowchart (400) illustrating an example method for securing the NN models, according to various embodiments. In an embodiment, the method allows the NN securing engine (110) to perform operations 401-405 of the flowchart (400). At 401, the method includes identifying the crucial layer of the first NN model that is to be deployed for processing in the second electronic device (200). At 402, the method includes extracting the layer of the first NN model. At 403, the method includes encrypting the crucial layer. At 404, the method includes generating the second NN model includes the encrypted crucial layer. At 405, the method includes deploying the second NN model to the second electronic device (200) for processing in the second electronic device (200).

The disclosed method provides a specially devised encryption scheme called Layer Encryption for encrypting weights of the crucial layer of the NN model whose change brings about major deviation in the output. The disclosed method provides a same level of security compared to complete model encryption but less overhead in terms of performance. The disclosed method provides secure run-time execution by decrypting the encrypted layers using the key stored in the ARM trust-zone and further computing the NN model in the ARM trust-zone. The disclosed method includes the ARM trust-zone based client validation prior to layer decryption and device integrity check prior to client authentication.

Figure 4:
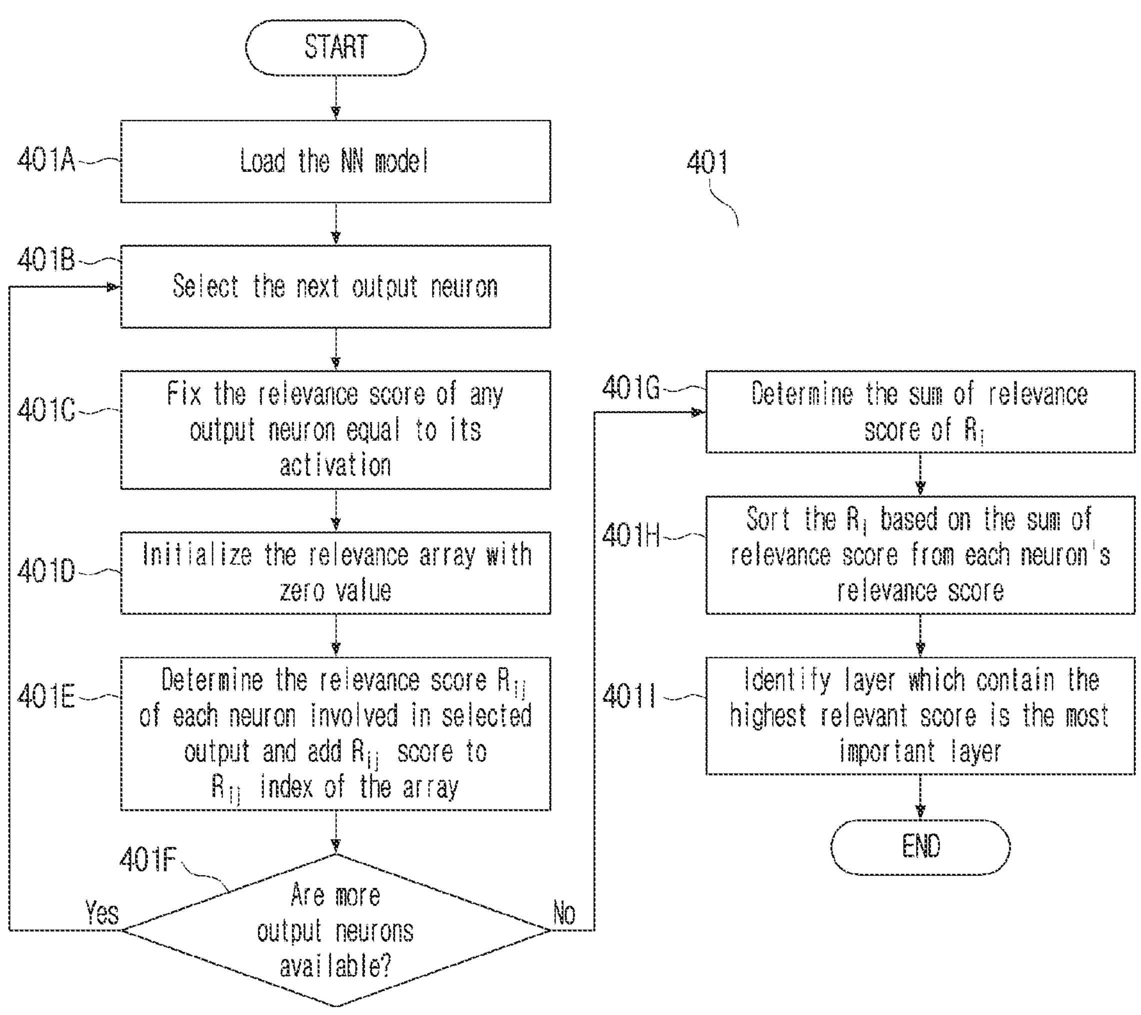
FIG. 4 is a flowchart illustrating an example method for identifying a crucial layer of a first NN model based on a relevance score of each layer of the first NN model, according to various embodiments.

FIG. 4 is a flowchart (401) illustrating an example method for identifying the crucial layer of the first NN model based on the relevance score of each layer of the first NN model, according to various embodiments. In an embodiment, the method allows the NN securing engine (110) to perform operations 401A-401I of the flowchart (401). At 401A, the method includes loading the NN model from the memory (120) or other source. At 401B, the method includes selecting a next output neuron from the NN model. At 401C, the method includes fixing the relevance score of any output neuron equal to its activation. At 401D, the method includes initializing the relevance array with zero value. At 401E, the method includes determining the relevance score Rij of each neuron involved in the selected output and add Rij score to Rij index of an array. In an embodiment, probability distribution is redistributed layer-by-layer to input data for determining the relevance score of each neuron. Further, data point level details are used to find relevance score. An equation that may be used to find the relevance score of jth layer Rj is given below.

$$R_j = \sum_k \frac{x_j w_{j,k}}{\sum_j x_j w_{j,k} + \varepsilon} R_k$$

where, Rk is relevance score of kth layer, Xj is input to jth layer, Wjk is the weight of jth layer to kth layer, c is to avoid zero weights.

At 401F, the method includes determining whether more output neurons are available. At 401G, the method includes determining the sum of relevance score of Ri. At 401H, the method includes sorting the Ri based on the sum of the relevance score from each neuron's relevance score. At 401I, the method includes identify the layer which contain the highest relevant score is the most important layer. A highly accurate relevancy score may be determined by modifying the working input and taking Layer-wise Relevance Propagation (LRP) again with modified input, determining the average of number modified with modified input LRP score, and determining the final relevance score decision using the array.

In an example method for identifying the crucial layer of the first NN model, the method includes analyzing input disturbance and distribution. The method includes modifying the working input and see how it affects the input distribution. A Local Interpretable Model-Agnostic Explanations (LIME) is used in case of image classification task for identifying the crucial layer.

The various actions, acts, blocks, steps, or the like in the flow diagrams (400, 401) may be performed in the order presented, in a different order, or simultaneously. Further, in various embodiments, some of the actions, acts, blocks, steps, or the like may be omitted, added, modified, skipped, or the like without departing from the scope of the disclosure.

Figure 5:
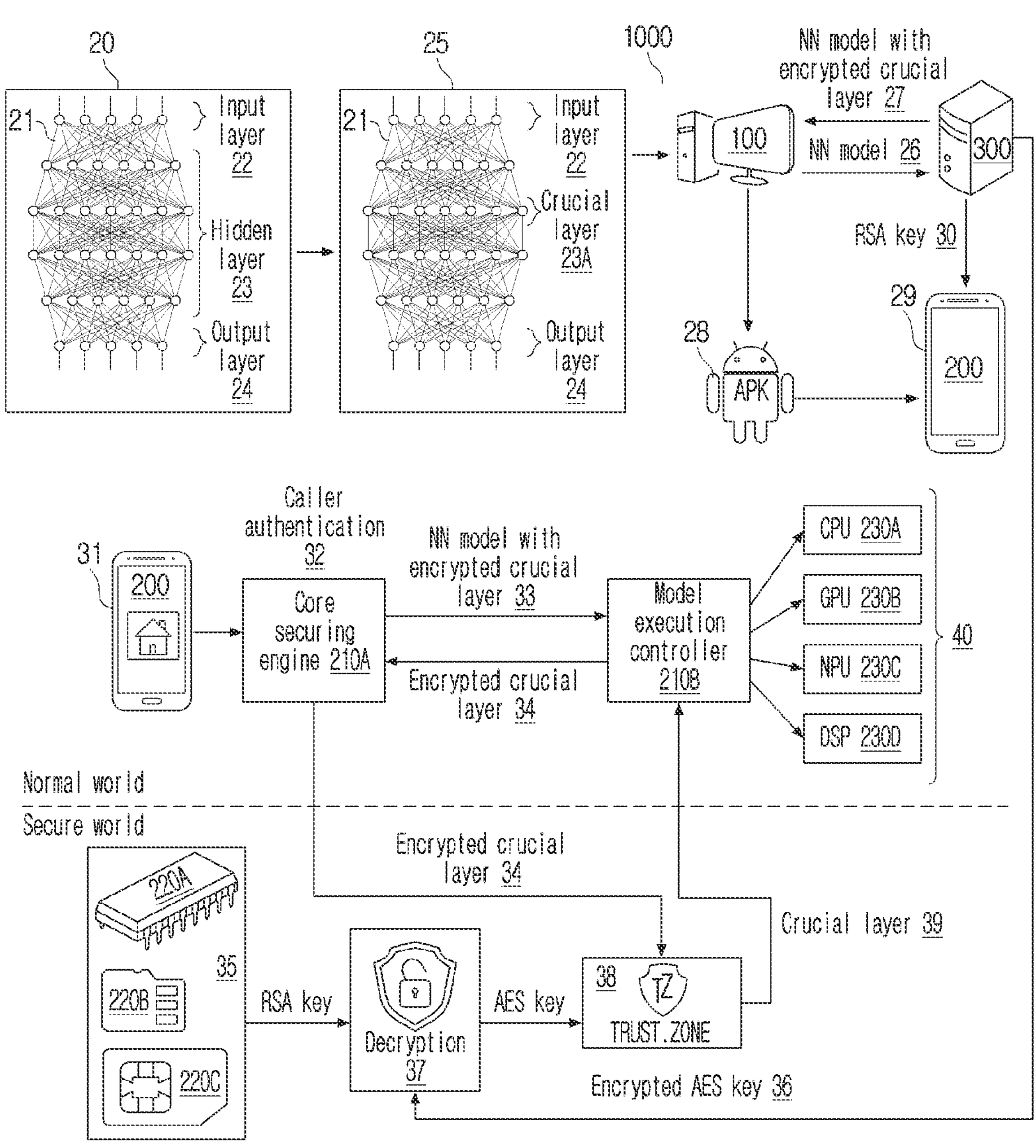
FIG. 5 is a diagram illustrating an example system for securing the NN models, according to various embodiments.

FIG. 5 is a diagram illustrating an example system (1000) for securing the NN models, according to various embodiments. The system (1000) provides a standard mechanism for storing and secure inference of the NN models on-device. In an embodiment, the system (1000) includes the first electronic device (100), the second electronic device (200), and the trusted server (300), where the second electronic device (200) includes the core securing engine (210A) and the model execution controller (210B). At 20, the first electronic device (100) receives the NN model (21) includes an input layer (22), hidden layers (23), and output layer (24). At 25, the first electronic device (100) identifies and extracts the crucial layer (23A) in the hidden layers (23) of the NN model (21).

At 26, the first electronic device (100) provides the crucial layer (23A) and the NN model (21) or other layers of the NN model (21) to the trusted server (300). The trusted server (300) encrypts the crucial layer (23A) of the NN model (21) using the AES key and reconstructs the NN model by replacing the crucial layer (23A) with the encrypted crucial layer. Further, the trusted server (300) encrypts the AES key using the asymmetric public key and stores the AES key to a keystore in the memory (320). At 27, the trusted server (300) provides the NN model with the encrypted crucial layer to the first electronic device (100). At 28, the first electronic device (100) creates the application package (APK) with the NN model includes the encrypted crucial layer. At 29, the first electronic device (100) deploys the application package on the second electronic device (200).

At 30, a manufacturer/developer can obtain the RSA key from the trusted server (300) and embeds to the secure storage such as the IC chip (220A), a memory card (220B), and the SIM (220C) of the second electronic device (200). At 31, a use-case needs to perform using the second electronic device (200), where the NN model has to execute for performing the use-case. At 32, the core securing engine (210A) checks device integrity of the system (100) and authenticates user/client/caller. At 33, upon successfully completing the device integrity check and the user/client/caller authentication, the core securing engine (210A) provides the NN model includes the encrypted crucial layer to the model execution controller (210B). At 34, the model execution controller (210B) extracts the encrypted crucial layer from the NN model and sends the encrypted crucial layer to the core securing engine (210A). At 35, the core securing engine (210A) obtains the RSA key from the secure storage of the second electronic device (200). At 36, the core securing engine (210A) fetches the encrypted AES key from the trusted server (300).

At 37, the core securing engine (210A) obtains the AES key by decrypting the encrypted AES key using the RSA key. At 38, the core securing engine (210A) provides the AES key, and the encrypted crucial layer and input data to the trusted zone of the second electronic device (200). At 39, the core securing engine (210A) generates the crucial layer by decrypting the encrypted crucial layer using the AES key and the input data, and provides the crucial layer to the model execution controller (210B). At 40, the model execution controller (210B) reconstructs the NN model by removing the encrypted crucial layer in the NN model and embedding the crucial layer with other layers of the NN model. Further, the model execution controller (210B) executes the reconstructed NN model using target processors (230) such as Central Processing Unit (CPU) (230A), Graphics Processing Unit (GPU) (230B), Neural Processing Unit (NPU) (230C), Digital Signal Processor (DSP) (230D), etc.

Operations 20, 25, 26, 27, 28, 29, 30, 31, 32, 33, 34, 40 are performed in a normal world (e.g. Android operating system), whereas operations 35, 36, 37, 38, 39 are performed in a secure world (e.g., Trusted Execution Environment (TEE)) (e.g. Trusted operating system). In an embodiment, the system (1000) can also process on a crucial subgraph of the NN model including a set of crucial layers instead of the crucial layer for securing the NN model.

Figure 6:
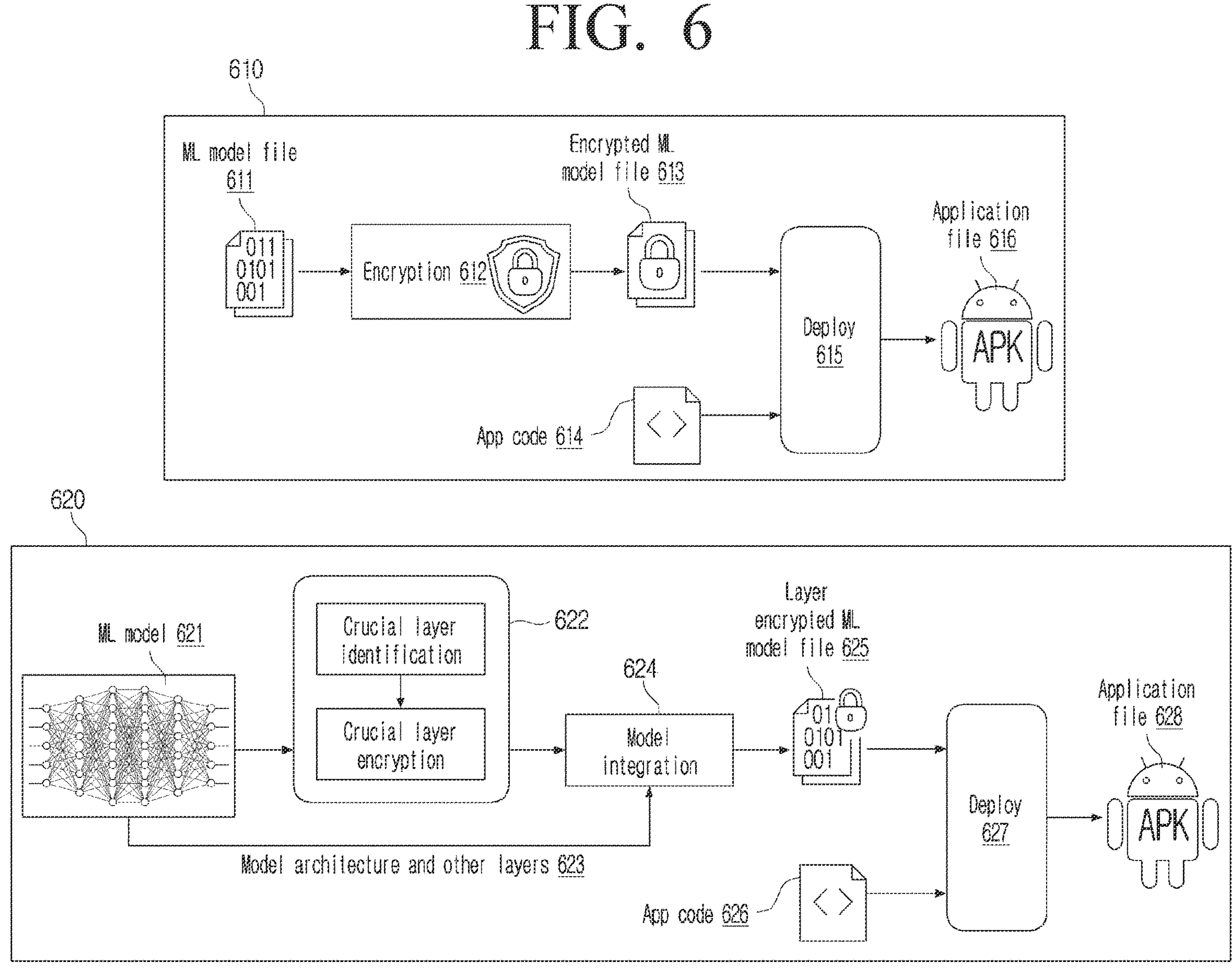
FIG. 6 is a diagram illustrating a comparison of completely securing an ML model and securing only crucial layers of the ML model, according to various embodiments.

FIG. 6 is a diagram illustrating a comparison of completely securing the ML model and securing only crucial layers of the ML model, according to various embodiments. A method of completely securing the ML model by an existing device is shown in 610. At 611-612, the existing device fetches a ML model file from the source and completely encrypts the ML model. At 615, the existing device deploys the encrypted ML model (613) and an app code (614) to generate an application file (616). The disclosed method of completely securing only the crucial layers of the ML model by the first device (100) is shown in 620. At 621, the first device (100) fetches a ML model file from the source, and loads the ML model from the file.

The IP of the ML model includes architecture and weights of the ML model. At 622, the first device (100) identifies the crucial layers of the ML model and encrypts only the crucial layers. At 623-624, the first device (100) obtains the ML model architecture and other layers of the ML model and integrates the other layers of the ML model with the encrypted crucial layers based on the ML model architecture. The layer encryption includes encrypting only the crucial layers of the ML model whose change brings about major deviation in the output. An inference time of the secured model is not increased much as decryption time of a few layers is significantly less compared to decryption time of the whole ML model. At 627, upon integration, the first device (100) deploys the layer encrypted ML model file (625) and an app code (626) to generate an application file (628).

In an example, Convolutional Neural Networks (CNN) includes an input layer, a convolution layer, a pooling layer, a fully connected layer, and an output layer. MobileNet_V2 model is a type of CNN in which the crucial layers of the MobileNet_V2 model are the input layer and the fully connected layer. Further by inverting weights of a combination of the fully connected layer and validating on the MobileNet_V2 model, most crucial fully connected layer can be determined. Upon encrypting only the identified fully connected layer, up to 80% improvement is obtained in NN model decryption time compared to decrypting fully encrypted model.

FIG. 7 is an architectural diagram illustrating an example configuration of the system (1000) for securing the NN models, according to various embodiments. In an embodiment, the first electronic device (100) of the system (1000) includes an encryption tool (e.g., NN securing engine 110). The first electronic device (100) uploads the NN model to the encryption tool, identifies important layers of the NN model, and sends the important layers and the NN model to the trusted server (300) of the system (1000) (refer to FIG. 5). The trusted server (300) includes a NN model key/policy storage located at the memory (320), where the trusted server (300) provides a NN model encryption service. The trusted server (300) encrypts the important layers using the key in the NN model key/policy storage, integrates the encrypted important layers with the NN model, and returns to the encryption tool. Further, the encryption tool adds the encrypted NN model to an application (250) and deploys the application (250) to the second electronic device (200).

In an embodiment, the second electronic device (200) includes the application (250), a framework (260), and the trusted zone (270). The application (250) includes the encrypted NN model and neural SDK. The framework (260) includes framework APIs, where the framework (260) performs decryption, authentication, and provides runtime security during model execution and TZ/kernel interaction. The decryption operation includes device integrity check, and key decryption. The authentication operation incudes the client authentication and policy enforcement. The trusted zone (270) includes a trusted application (271) for key management, layer decryption, and layer computation. For deploying the application (250), the second electronic device (200) checks device integrity, retrieves NN model from the application APK, fetches decryption key/policy file, and decrypts the policy file. For executing the application (250), the second electronic device (200) authenticate clients to access the NN model, loads the encrypted NN model, decrypt the key for the layer decryption in the TZ, decrypts the encrypted important layers in the TZ, computes the important layer in the TZ, and returns the NN model results to the framework (260).

FIG. 8 is a flow diagram illustrating an example method for authenticating the client, according to various embodiments. The method includes the device integrity check to ensure the device is not in compromised state. The method includes secure validation of the clients using cryptographic certifications and attestation servers ensure controlled access of model. The method includes revocation/blacklisting of clients in case some validation failure ensures protection against malicious operations. When the client tries to load the secure model file, then the authentication API parses the secure model file package to get the authentication policy and cryptographic information and communicates with a Trusted Zone client (TZ client) to validate the integrity of the information and validates whether the caller has proper access to load the model or not based on the authentication policy. As shown in 810, if the caller information is found in the authentication policy, then the client is allowed to load their model. As shown in 820, if the caller information is not found in the authentication policy, then the client is not allowed to load the model.

Figure 9:
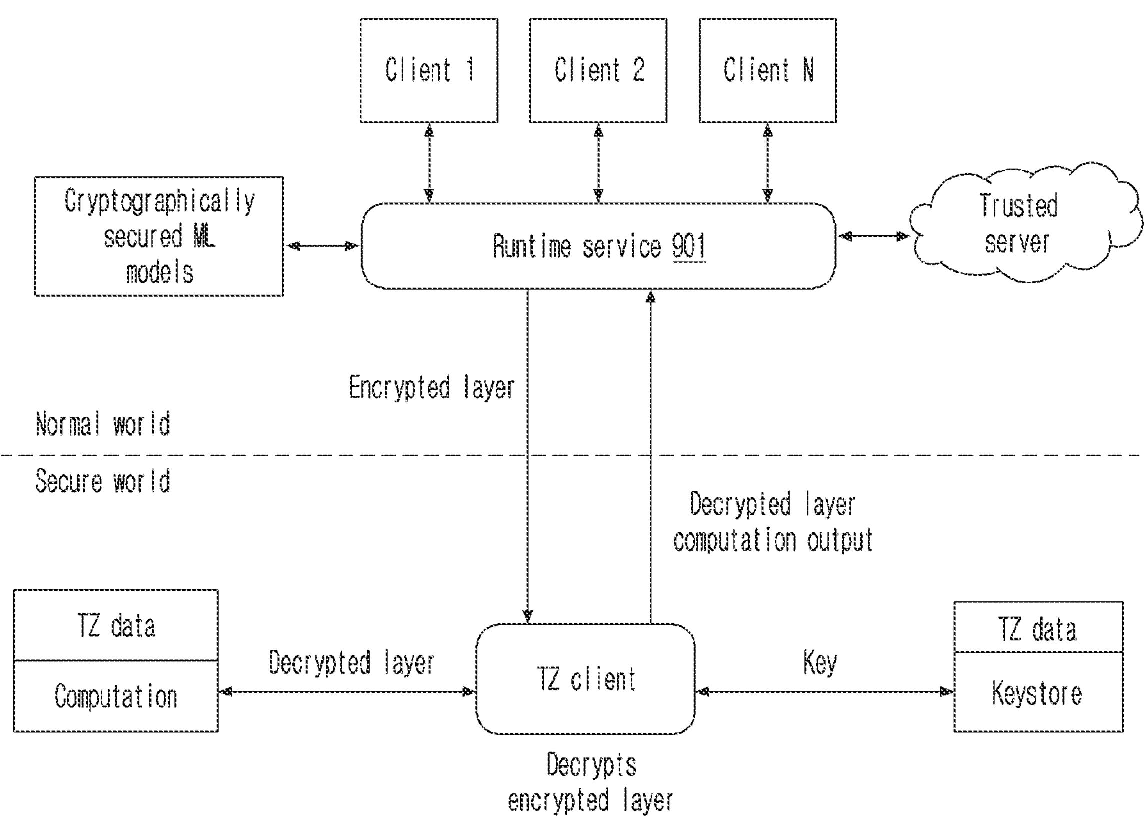
FIG. 9 is a flow diagram illustrating an example run-time execution of the ML model, according to various embodiments.

FIG. 9 is a flow diagram illustrating an example run-time execution of the ML model, according to various embodiments. The trusted zone-based key retrieval and decryption of the NN models, execution of encrypted layers of the NN models in the trust zone is shown in FIG. 9. The method provides protection against model theft by securing model from RAM dump attacks. Runtime service (901) can receive cryptographically secured ML models of N number of clients (e.g., client 1 to client N) simultaneously. The runtime service manages all the ML models and communicates with the trusted server to get the cryptographic keys and communicates with the trusted zone to decrypt the encrypted layers of the ML models. Further, the runtime service executes the ML models with the decrypted layers in the trusted zone and sent results back to the clients. Hence the decrypted layers of the ML models never exposed to the RAM and protects from RAM dump attacks.

Figure 10:
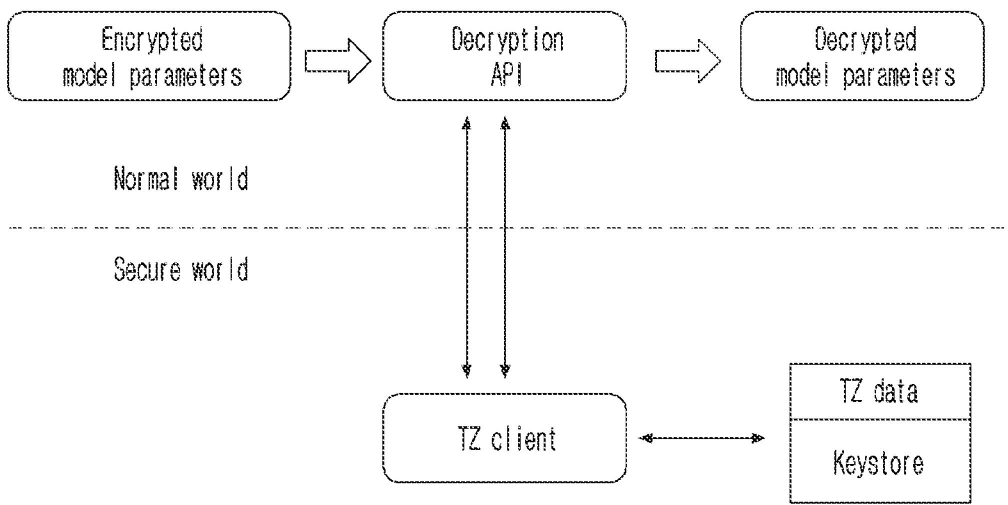
FIG. 10 is a flow diagram illustrating an example method for securing the NN models, according to various embodiments.

FIG. 10 is a flow diagram illustrating an example method for securing the NN models, according to various embodiments. In this method of securing the NN models, model parameters are used to secure. The model parameters are all the parameters that can be arbitrarily set for training the model (e.g. number of estimators in Random Forest). The parameters differentiate the NN model from all the other models which are used with the same architecture. Hence, stealing of parameters lead to stealing of the NN model architecture. In the case of on-device learning, securing the model parameters become necessary as the parameters reside in the device. As an expansion use case, the model parameters can also be stored in the encrypted form and decrypted in the trusted zone at runtime for training the NN model. During NN model training on the device, the encrypted model parameters are passed to decryption API of the trusted zone to get decrypted model parameters which can be used in model training process.

The various embodiments disclosed herein can be implemented using at least one hardware device and performing network management functions to control the elements.

While the disclosure has been illustrated and described with reference to various example embodiments, it will be understood that the various example embodiments are intended to be illustrative, not limiting. It will be further understood that those skilled in the art may readily modify and/or adapt for various applications such specific embodiments without departing from the true spirit and full scope of the disclosure, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of various example embodiments, those skilled in the art will recognize that the embodiments herein can be practiced with modification within the scope of the disclosure as described herein. It will also be understood that any of the embodiment(s) described herein may be used in conjunction with any other embodiment(s) described herein.

What is claimed is:

1. A method for securing Neural Network (NN) models, the method comprising:

identifying, by a first electronic device, at least one crucial layer of a first NN model that is to be deployed for processing in a second electronic device;

extracting, by the first electronic device, the at least one crucial layer of the first NN model;

encrypting, by the first electronic device, the at least one crucial layer;

generating, by the first electronic device, a second NN model including the at least one encrypted crucial layer; and deploying, by the first electronic device, the second NN model to the second electronic device for processing in the second electronic device, wherein identifying, by the first electronic device, the at least one crucial layer of the first NN model that is to be deployed for processing in the second electronic device, comprises:

identifying, by the first electronic device, the at least one crucial layer of the first NN model based on at least one of a relevance score and weights of each layer of the first NN model, wherein identifying, by the first electronic device, the at least one crucial layer of the first NN model based on the weights of each layer of the first NN model, comprises:

monitoring, by the first electronic device, behavior of the weights of each layer of the first NN model after each training cycle of the first NN model; and determining, by the first electronic device, the at least one crucial layer of the first NN model by identifying, during a training process, a layer among a plurality of layers of the first NN model whose weights converge to a final value earliest.

2. The method as claimed in claim 1, wherein identifying, by the first electronic device, the at least one crucial layer of the first NN model based on the relevance score of each layer of the first NN model, comprises:

loading, by the first electronic device, the first NN model;

monitoring, by the first electronic device, a plurality of output neurons of each layer of the first NN model;

determining, by the first electronic device, a relevance score of each output neuron, wherein the relevance score is a function of impact on an output of one layer of the first NN model for each output neuron; and determining, by the first electronic device, the at least one crucial layer of the first NN model by identifying the layer with a highest sum of relevance score of the output neurons from that layer.

3. The method as claimed in claim 1, wherein identifying, by the first electronic device, the at least one crucial layer of the first NN model based on the weights of each layer of the first NN model, comprises:

determining, by the first electronic device, an average of absolute values of the weights of each layer of the first NN model, wherein the first NN model is a trained NN model; and determining, by the first electronic device, the at least one crucial layer of the first NN model by identifying the layer with a highest average of absolute values of the weights.

4. The method as claimed in claim 1, wherein identifying, by the first electronic device, the at least one crucial layer of the first NN model based on the weights of each layer of the first NN model, comprises:

replacing, by the first electronic device, the weights of a combination of the layers of the first NN model with arbitrary values, wherein the first NN model is a trained NN model; and determining, by the first electronic device, the at least one crucial layer of the first NN model by identifying the combination of the layers that result in lowest accuracy.

5. The method as claimed in claim 1, wherein encrypting, by the first electronic device, the at least one crucial layer, comprises:

sending, by the first electronic device, the at least one crucial layer to a trusted server for encrypting the at least one crucial layer; and receiving, by the first electronic device, the at least one encrypted crucial layer from the trusted server, wherein the trusted server encrypts the at least one crucial layer using a symmetric key, encrypts the symmetric key using an asymmetric public key, and stores the encrypted symmetric key.

6. The method as claimed in claim 1, wherein deploying, by the first electronic device, the second NN model to the second electronic device for processing in the second electronic device, comprises:

creating, by the first electronic device, a policy file comprising a decryption policy for the at least one encrypted crucial layer and access control parameters for client authentication during execution on the second electronic device;

generating, by the first electronic device, an execution file comprising the second NN model and the policy file; and deploying, by the first electronic device, the execution file on the second electronic device.

7. The method as claimed in claim 1, wherein the method comprises:

receiving, by the second electronic device, an input for execution of the second NN model; and executing, by the second electronic device, an execution file based on a policy file.

8. The method as claimed in claim 7, wherein executing, by the second electronic device, the execution file of the second NN model based on the policy file, comprises:

fetching, by the second electronic device, an encrypted symmetric key from a trusted server based on the policy file;

generating, by the second electronic device, a symmetric key by decrypting the encrypted symmetric key at a trusted zone of the second electronic device using an asymmetric encryption based private key stored in a secure storage of the second electronic device;

extracting, by the second electronic device, the at least one encrypted crucial layer in the second NN model from the execution file;

generating, by the second electronic device, the at least one crucial layer by decrypting the at least one encrypted crucial layer at the trusted zone of the second electronic device using the symmetric key; and executing, by the second electronic device, the execution file using the at least one crucial layer.

9. The method as claimed in claim 7, wherein the method further comprises:

authenticating, by the second electronic device, an application corresponding to the execution file installed in the second electronic device for allowing the application to access the second NN model for the execution; and validating, by the second electronic device, the application in a trusted zone using cryptographic certifications and attestation servers for controlled access of the second NN model.

10. A first electronic device configured to secure Neural Network (NN) models, comprising:

a memory;

a processor; and a NN securing engine comprising processing circuitry and/or executable program instructions, operably coupled to the memory and the processor, configured to:

identify at least one crucial layer of a first NN model to be deployed for processing in a second electronic device, extract the at least one crucial layer of the first NN model, encrypt the at least one crucial layer, generate a second NN model comprises the at least one encrypted crucial layer, and deploy the second NN model to the second electronic device for processing in the second electronic device, wherein identifying the at least one crucial layer of the first NN model to be deployed for processing in the second electronic device, comprises:

identifying the at least one crucial layer of the first NN model based on at least one of a relevance score and weights of each layer of the first NN model, wherein identifying the at least one crucial layer of the first NN model based on the weights of each layer of the first NN model, comprises:

monitoring behavior of the weights of each layer of the first NN model based on each training cycle of the first NN model; and determining the at least one crucial layer of the first NN model by identifying, during a training process, a layer among a plurality of lavers of the first NN model whose weights converge a final value at the earliest.

11. The first electronic device as claimed in claim 10, wherein identifying the at least one crucial layer of the first NN model based on the relevance score of each layer of the first NN model, comprises:

loading the first NN model;

monitoring a plurality of output neurons of each layer of the first NN model;

determining a relevance score of each output neuron, wherein the relevance score is a function of impact on an output of one layer of the first NN model for each output neuron; and determining the at least one crucial layer of the first NN model by identifying the layer with a highest sum of relevance score of the output neurons from that layer.

* * * * *